United States Patent [19]
Nishimaki

[11] Patent Number: 6,148,688
[45] Date of Patent: Nov. 21, 2000

[54] WORK-MACHINE-LEVER-SUPPORT STRUCTURE FOR WORK VEHICLE

[75] Inventor: Kazuhito Nishimaki, Niigata-ken, Japan

[73] Assignee: Komatsu Est Corporation, Niigata-Ken, Japan

[21] Appl. No.: 09/228,022

[22] Filed: Jan. 8, 1999

[30] Foreign Application Priority Data

Jan. 9, 1998 [JP] Japan .................................. 10-003334

[51] Int. Cl.[7] .............................. B62D 1/18; B60K 26/00
[52] U.S. Cl. ......................... 74/493; 74/484 R; 180/272; 180/326; 180/334; 280/775
[58] Field of Search ................................ 74/484 R, 493; 180/272, 326, 334; 280/775

[56] References Cited

U.S. PATENT DOCUMENTS

| | | | |
|---|---|---|---|
| Re. 31,646 | 8/1984 | Beals et al. | 180/78 |
| 4,664,221 | 5/1987 | Loney et al. | 180/315 |
| 4,682,787 | 7/1987 | Ruhter et al. | 280/775 |
| 4,706,776 | 11/1987 | Hyoki et al. | 180/334 |
| 4,733,745 | 3/1988 | Lumpkins | 180/315 |
| 5,584,346 | 12/1996 | Sakamoto et al. | 172/4.5 |

FOREIGN PATENT DOCUMENTS

| | | |
|---|---|---|
| 6-101247 | 7/1992 | Japan . |
| 7-173853 | 12/1993 | Japan . |

*Primary Examiner*—Allan D. Herrmann
*Attorney, Agent, or Firm*—Bell Boyd & Lloyd, LLC

[57] ABSTRACT

A work machine lever for a work vehicle comprises a base end portion supported in a steering-wheel-support box and a free end portion disposed on a side of a steering wheel. The free end portion is provided with a lever-operating portion, which can be pivotally rotated between at least two positions, i.e., an operating position on the side of the steering wheel and a non-operating position in front of the steering wheel about a support base end portion of the steering-wheel-support box as a pivot and can be fixed at the respective rotation positions. Therefore, when the operator gets on and off the vehicle, the work machine lever is rotated to be fixed at a forward lever non-operating position to form a large passage space on a side of the steering wheel. In such a work-machine-lever-support structure a view from an operation room of a vehicle is ensured, the work machine lever can be easily operated, a space for getting on and off the vehicle is sufficiently obtained, and an operator can get on and off the vehicle without moving by mistake the operating lever.

7 Claims, 9 Drawing Sheets

WORK-MACHINE-LEVER-SUPPORT STRUCTURE FOR WORK VEHICLE

BACKGROUND OF THE INVENTION

1. Field of the Invention

The present invention relates to a work-machine-lever-support structure for a work vehicle such as various construction equipment including a motor grader, a power shovel, a bulldozer, and the like, or various transportation equipment such as a crane or a transportation vehicle. More particularly, this invention relates to a work-machine-lever-support structure in which the work machine lever can be easily handled, an operator can easily get on and off the vehicle, and the work machine lever is prevented from being operated by mistake when the operator gets on and off the vehicle.

2. Description of the Related Art

One of work vehicles of this type which requires much skill of the operator in operation of the work machine is a motor grader. A motor grader comprises, as shown in FIGS. 1 and 2, for example, a drawbar 2 swingably carried on a front end portion of a vehicle body 1, left and right vertical cylinders 3, 4 for ascending and descending and a cross sliding cylinder 5 connecting the drawbar 2 and the vehicle body 1, a turning circle 6 mounted to the drawbar 2 and turnable by a turning hydraulic motor 7, a blade 9 mounted to a bracket 6a of the turning circle 6 and laterally movable by a shift cylinder 10, and a front wheel 1a which can be laterally leant by a leaning cylinder (not shown).

The above various cylinders and hydraulic motor are operated by an operator in an operation room 11 disposed at a central portion toward a rear end of the vehicle body 1. The motor grader is, as its character requires, designed such that a range of vision from the operation room 11 is as wide as possible. Particularly, in order to reliably allow the operator to look straight at a positioning relationship between the laterally-extending blade 9 obliquely below in front of the operation room 11 and a ground surface with which the blade 9 is in contact, it is necessary to remove as many members as possible that can obstruct the view in front of the operation room 11.

For this purpose, for example, a glass window is detachably mounted at a lower half portion of a front face of the operation room 11, and left and right doors 11a for getting on and off the vehicle are mounted to side walls of the operation room 11 such that the doors 11a can be opened and closed from the front, as shown in FIG. 1. With such structures, the operator can remove the lower half window of the front face and partly open the left and right doors to ensure his/her view in his/her front in the oblique lower direction, if necessary.

Recently, various improvements have been accomplished in this type of vehicle to ensure the view and to facilitate operation of various work machines. One of such improvements is disclosed in Japanese Patent Laid-open Publication No. 6-101247, for example, in which a plurality of operations of the work machine can be carried out by a single operating lever. In this machine, operations of the single operating lever in all directions are converted into electric signals through an electronic controller such as a microcomputer and an electromagnetic flow controlling valve, for example. Then, the above various cylinders and hydraulic motor are controlled and activated based on the electric signals, thereby obtaining a desired ascending or descending position or a desired turning operation of the blade, for example. As compared with a conventional mechanical work machine lever in which the flow rate controlling valve is directly operated through various link mechanisms, a number of the operating levers can be largely reduced and the operating levers take up extremely little space, thereby widening a space for operation in the operation room or making the operation room compact.

There is another example in which an operability of the work machine lever is improved in addition to making the operation room compact, as disclosed in Japanese Patent Laid-open Publication No. 7-173853, for example. The work machine levers disclosed in the above Japanese Patent Laid-open Publication No. 6-101247 is mounted to a floor on left and right sides of a seat. According to the Japanese Patent laid-open Publication No. 7-173853, an end of a shaft is fixed to left and right side walls of a steering post (a steering-wheel-support box) which stands centrally at a front end of the operation room, a free end portion of the shaft extends up to a side of a steering wheel, and a single work machine lever is mounted to the free end portion of the shaft. With such a structure, the operator can easily operate the steering wheel and the work machine levers both in his seated and standing positions, without getting into a special position for either of them, thereby remarkably increasing operability.

With the arrangement of the work machine levers as disclosed in the above Japanese patent Laid-open Publication No. 6-101247, the operator can extremely easily operate the work machine levers in his seated position. However, the operator has to bend himself/herself forward and turn obliquely rearward to operate the work machine levers in his/her standing position, so that the operator can not easily carry out delicate operations, and is extremely fatigued physically.

According to the above Japanese Patent Laid-open Publication No. 7-173853, on the other hand, the operability of the work machine operating lever is remarkably improved as compared with conventional mechanical lever arrangement in which a large number of work machine operating levers are arranged in row on left and right of the steering post, and further as compared with the work machine operating levers disclosed in the above Japanese Patent Laid-open Publication No. 6-101247. However, in order to ensure the view of the operator in the oblique lower direction in front of the operation room, the above-mentioned conventional mechanism still has to be employed for mounting the lower half window at the front face of the operation room and the left and right doors for getting on and off the vehicle.

Apart from mounting of the window, a change of the mounting mechanism of the door is difficult in the present condition, and the operator has to get on and off the operation room through left and right front sides of the operation room. Even if the operating levers can be electrically operated and the number of levers is decreased, from a standpoint of ensuring the view, it is desirable to make the operation room, particularly, a floor face of the operation room, small in size. Consequently, as an area where the operating lever are mounted is made smaller, an area of the floor is decreased, which makes a space for getting on and off the operation room smaller.

With the arrangement of the work machine levers disclosed in the above Japanese Patent Laid-open Publication No. 6-101247, because the work machine levers are disposed on the floor face on left and right of the seat, the operator can promptly enter and going out of the room by opening the door and passing beside the steering wheel. However, because the work machine operating levers as disclosed in the above Japanese Patent Laid-open Publication No. 7-173853 are fixed to a certain position on either side of the steering wheel, the operator's body may often interfere with the work machine operating levers to move the lever by mistake when the operator gets on and off the operation room.

SUMMARY OF THE INVENTION

The present invention has been accomplished to solve the above problems, and it is an object of the invention to provide a work-machine-lever-support structure in which the view of the operator is ensured, the work machine levers can be easily operated, the operator is prevented from operating the operating lever by mistake when he/she gets on or off the operation room, a space enough for the operator to get on or off is ensured, and the operator can get on and off without any anxiety.

The above object is achieved by inventions as described below.

According to a first aspect of the present invention, there is provided a work-machine-lever-support structure for a work vehicle wherein a work machine lever comprises a base end portion supported in a steering-wheel-support box and a free end portion disposed on a side of a steering wheel, the free end portion of the work machine lever having a lever-operating portion, and the lever-operating portion being supported and fixed so as to be pivotally rotatable between at least two positions, i.e., an operating position on a side of the steering wheel and a non-operating position in front of the steering wheel, about the base end portion of the steering-wheel-support box as a pivot.

When the work machine lever is operated, the work machine lever is pivotally rotated about and fixed at the base end portion such that the lever-operating portion is positioned at an operating position on a side of the steering wheel. As a means for fixing the work machine lever, various mechanisms are possible to be applied. However, in order to avoid rattling in operation or traveling, it is preferable that the work machine lever is fixed to the steering-wheel-support box at its pivot portion (support base end portion) by pins or bolts. When the work machine lever is positioned at the above operating position, the lever can be always handled on a side of an operating face of the steering wheel. Therefore, it is unnecessary for an operator to get into a special position for operating the lever, and the operator can extremely easily handle the steering wheel and the lever simultaneously or operate them selectively.

When all operations are completed and the operator gets off a vehicle, the work machine lever is pivotally rotated forward about its base end portion as a pivot and the lever-operating portion is fixed to a position in front of the steering wheel. As fixing means at this time, the above similar means can be employed. Because of this pivotal rotation, the lever-operating portion is removed from the side of the steering wheel to obtain a space which is sufficient to allow the operator to get on and off the vehicle at the side of the steering wheel. Therefore, when the operator gets on and off the vehicle after opening a door from a front side of an operation room, the operator can easily get on and off the vehicle without interfering with the lever-operating portion.

According to a second aspect of the present invention, the lever-support base end portion of the steering-wheel-support box includes a means for suppressing a pivotal rotation of the work machine lever. As the pivotal-rotation suppressing means, there is a means in which a part of the lever-support base end portion is urged and pressed against the steering-wheel-support box by a resilient member and a friction force is utilized, for example. At this time, if a friction member is disposed on a contact face between the part of the lever-support base end portion and the steering-wheel-support box, the friction force can be increased to effectively suppress a free pivotal rotation. By this suppression of pivotal rotation, when the above work machine lever is pivotally rotated, the free pivotal rotation of the work machine lever due to a weight of the lever is prevented, thereby facilitating fixing of the lever to certain positions as mentioned above.

According to a third aspect of the present invention, the work-machine-lever-support structure further comprises a safety switch for outputting a signal for prohibiting an activation of the work machine when the work machine lever pivotally rotates to the non-operating position. In other words, when the work machine lever is not in operation, but pivotally rotated to the non-operating position, the safety switch is turned on. When the signal from the switch is input, a controller does not output a work machine command signal even if the work machine lever is handled. Therefore, the nonoperating state of the work machine is maintained even if the lever-operating portion of the work machine lever is handled carelessly.

According to a fourth aspect of the present invention, the work machine lever includes an arm and the lever-operating portion mounted to a free end portion of the arm. The lever-operating portion is supported and fixed at the free end portion of the arm as a pivot for back and forth pivotal rotation, and a steering post constituting the steering-wheel-support box is supported for pivotal rotation between a standing operating position and a seated operating position, about a standing base end portion of the steering post as a pivot. With this structure, the operator can select the best position to handle the lever easily and can avoid any fatigue due to the work, by pivotally rotating back and forth and fixing the lever-operating portion of the work machine lever to a desired position on the free end portion of the arm, when the operator pivotally rotates the lever-operating portion to a front operating position where the operator stands or to a back operating position where the operator is seated.

DESCRIPTION OF EMBODIMENTS

Embodiments of the present invention will be described in detail below based on the illustrated examples shown in the accompanying drawings.

Figure 1:
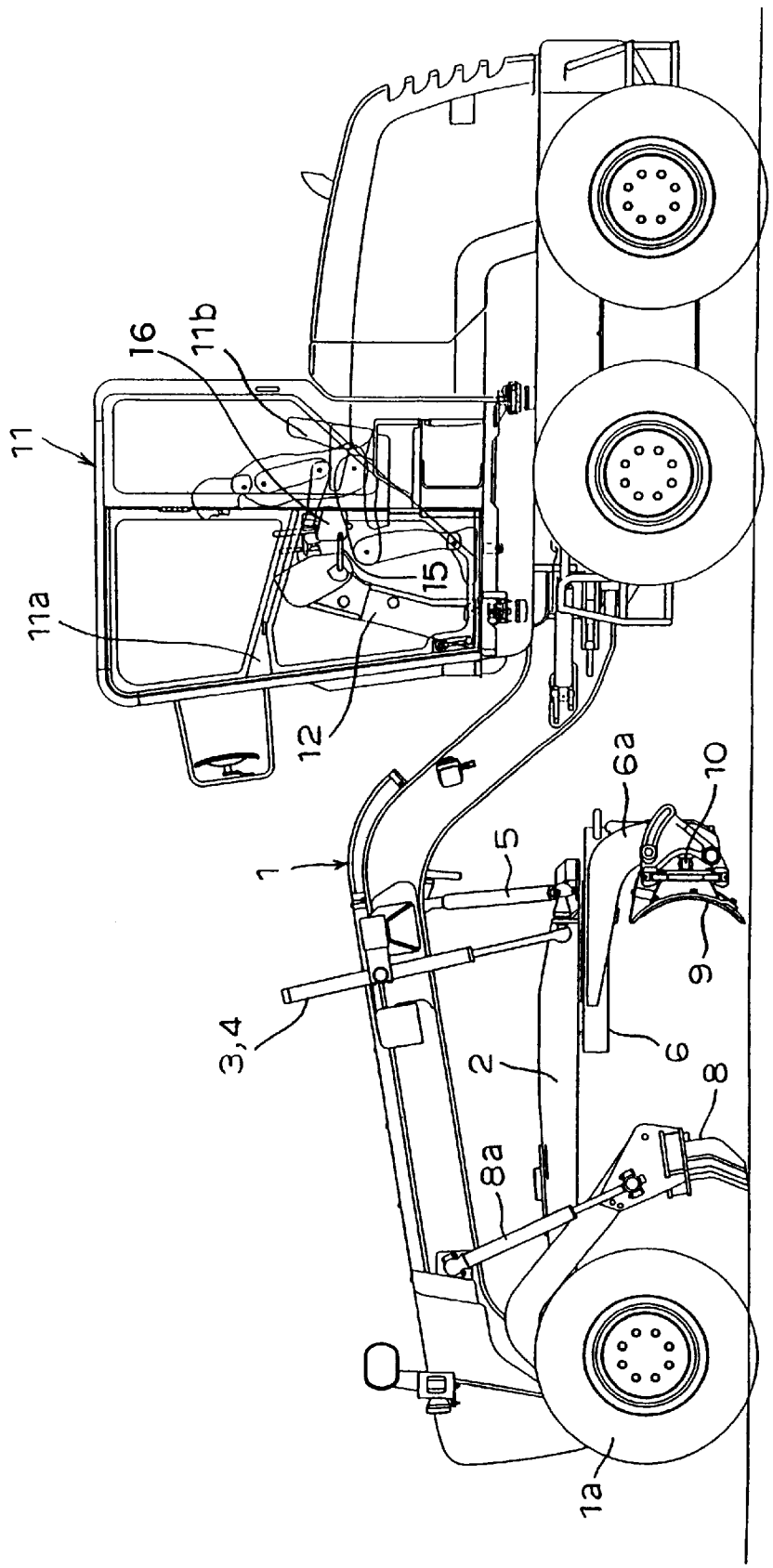
FIG. 1 is a side view of an entire structure of a motor grader to which the present invention is applied.
Figure 2:
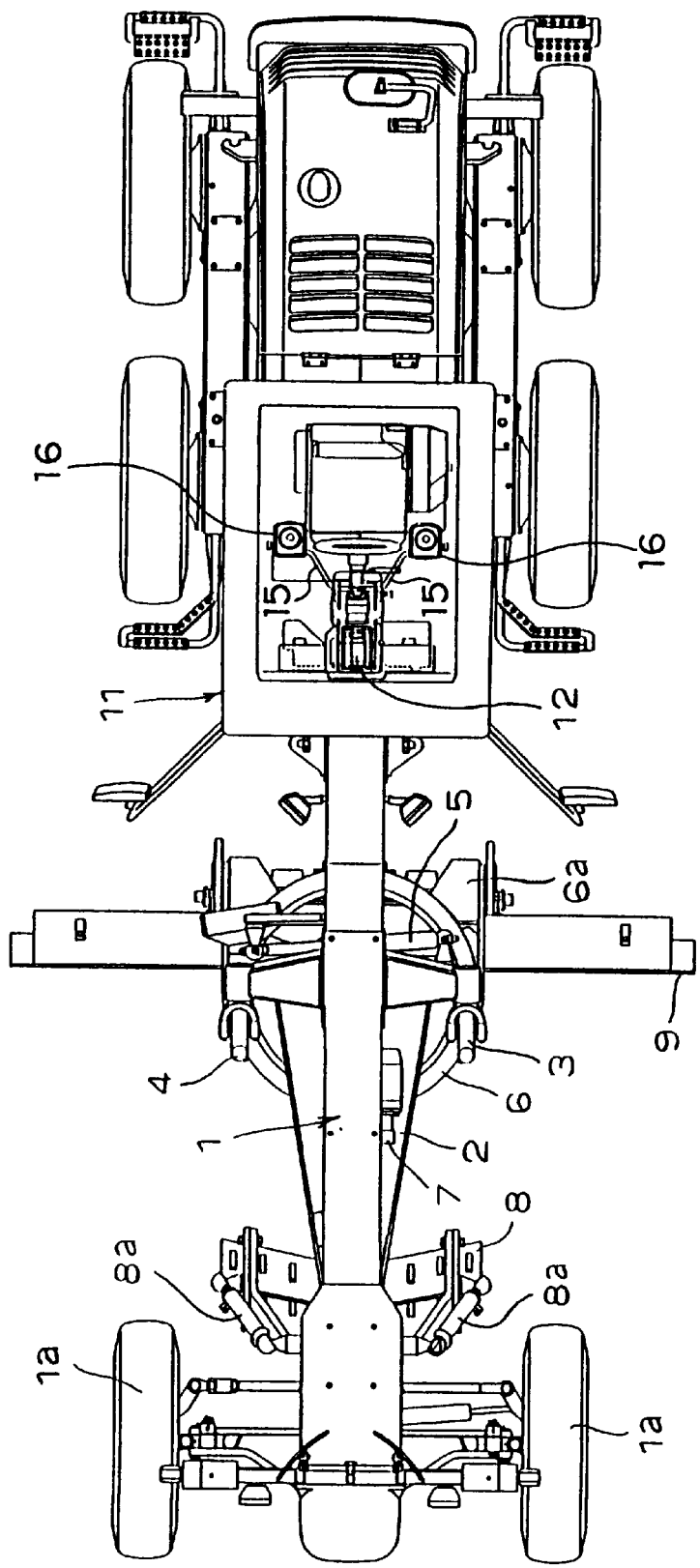
FIG. 2 is a top view of the motor grader shown in FIG. 1.

FIGS. 1 and 2 are a side view and a top view of an entire motor grader to which the invention is applied. The vehicle to which a work-machine-lever-support structure of the invention can be applied is not limited to a motor grader, but the structure can be applied to work vehicles such as various construction vehicles and transportation vehicles.

The motor grader as respectively shown in FIGS. 1 and 2 comprises a drawbar 2 carried on a front end portion of a vehicle body 1 for a swinging movement in vertical and lateral directions. The vehicle body 1 and the drawbar 2 are connected to each other by left and right vertical cylinders 3 and 4 for ascending and descending. A turning circle 6 is mounted to the drawbar 2 for turning by a turning hydraulic motor 7. A cross-sliding cylinder 5 is obliquely connected across the vertical cylinders 3 and 4 between the turning circle 6 and the vehicle body 1. A blade 9 is mounted to a bracket 6a extending rearward from the turning circle 6 so as to be laterally movable by a shift cylinder 10. Furthermore, a front wheel 1a is carried on a front end of the vehicle body 1 and is laterally movable by a leaning cylinder (not shown). A scarifier 8 is carried on the front end portion of the vehicle body 1 so as to be vertically movable by a scarifier cylinder 8a.

As shown in FIGS. 1 and 2, there is provided a steering post 12 constituting a steering-wheel-support box standing obliquely rearward stands at a center on a floor face of a front end portion of the operation room 11. A steering wheel 13 for traveling is mounted to an end of a steering shaft 13a which is mounted to project rearward from a portion right below a display panel portion (not shown) at an upper end of the steering post 12. According to the present embodiment, the steering post 12 can swing back and forth with respect to its standing base end portion as a pivot. As such a swinging mechanism, a known mechanism as disclosed in Japanese Utility Model Laid-open Publication No. 55-95964 and Japanese Patent Publication No. 7-35145, can be employed. When the steering post 12 swings forward to stand substantially vertically, an operator handles work machine levers 14 in his/her standing position. When the steering post 12 leans rearward to be fixed, the operator operates the work machine levers 14 in his/her seated position on a driver's seat 11b. Doors 11a for getting on and off are mounted to the left and right sides of the operation room 11 and are hinged at their rear ends to the operation room 11 so that the operator can open the doors from a forward direction of the vehicle.

Figure 3:
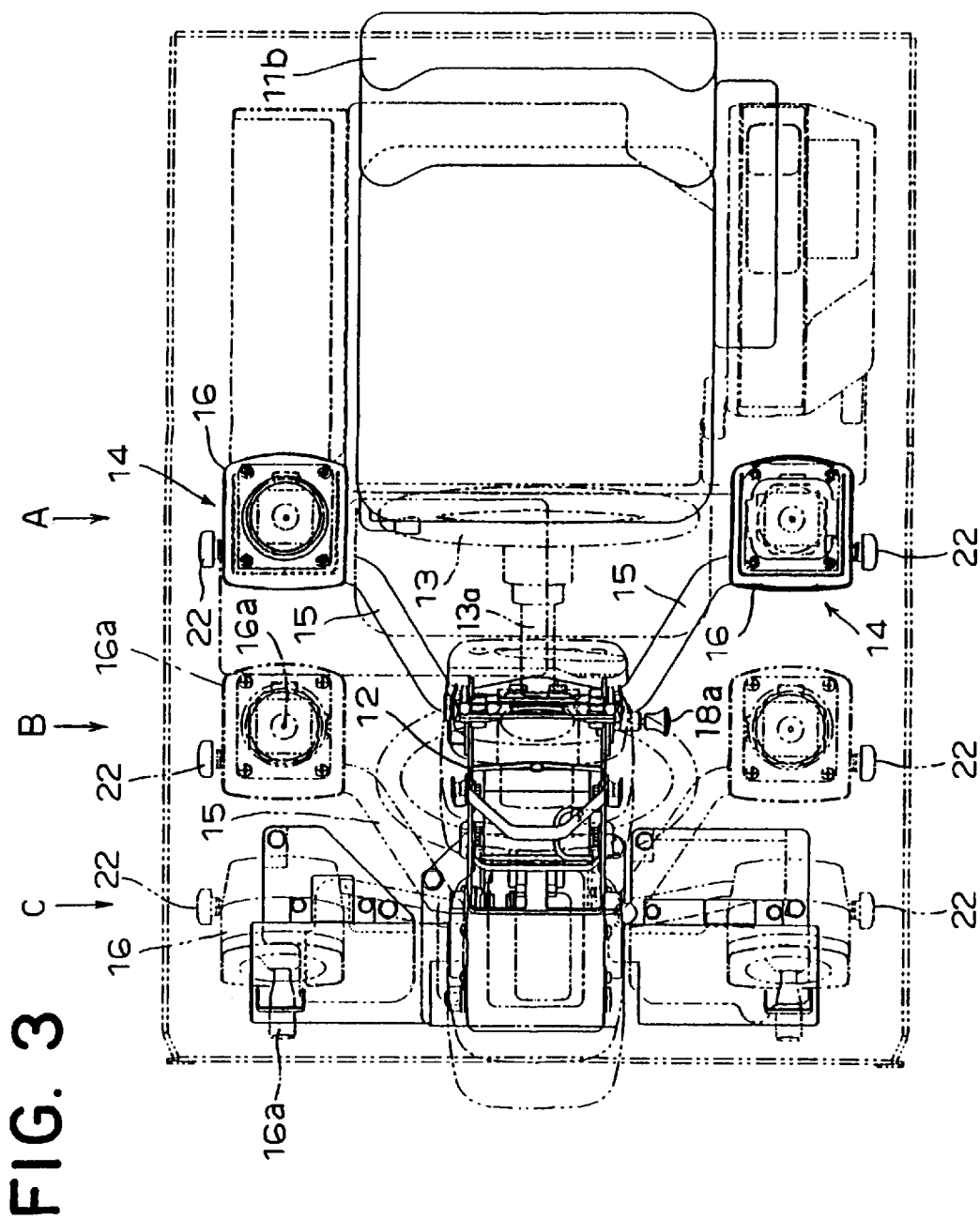
FIG. 3 is a top view showing an operational pattern of work machine levers disposed in an operation room of the motor grader.
Figure 4:
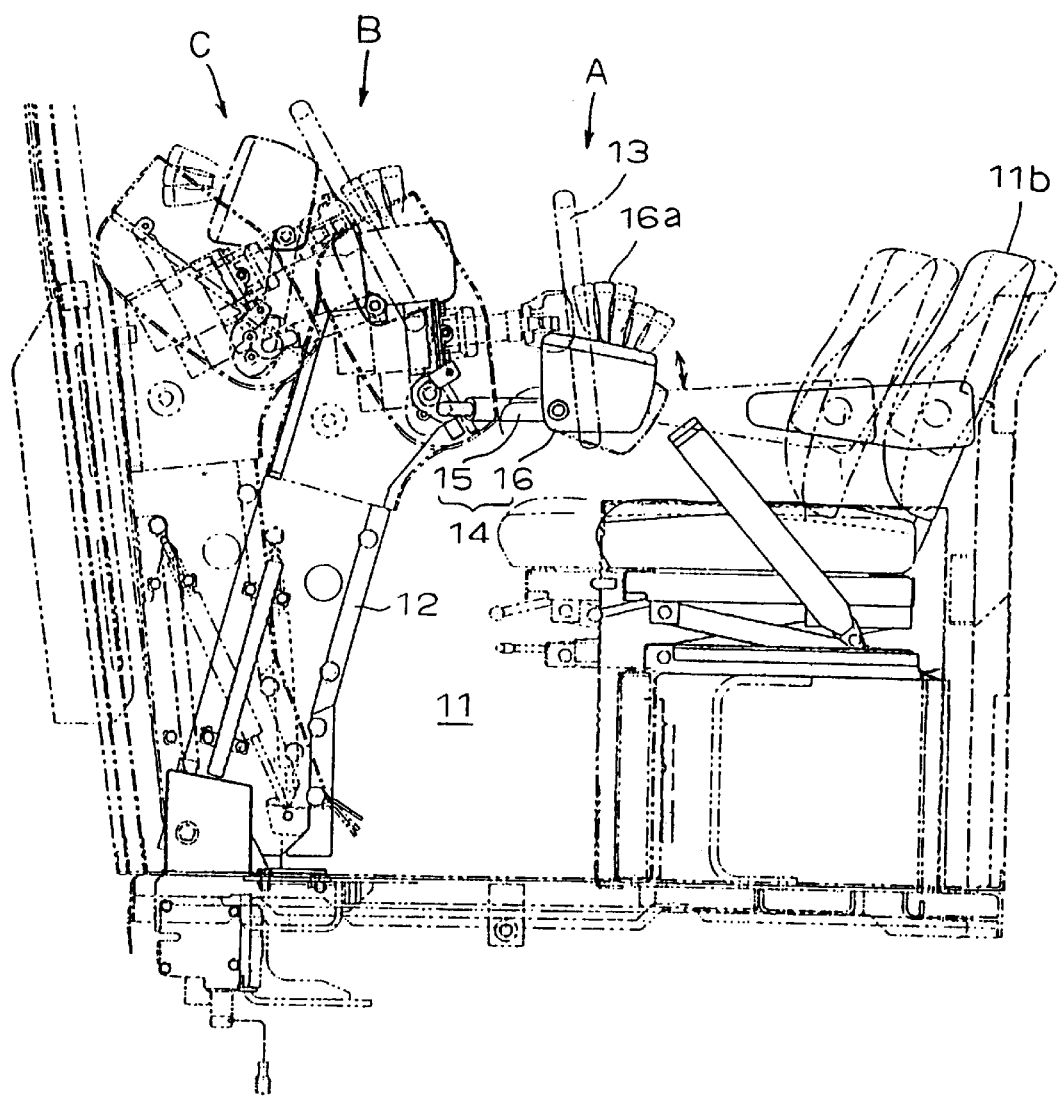
FIG. 4 is a side view of the levers shown in FIG. 3.

FIGS. 3 and 4 show the most characteristic operation pattern of the support structure of the work machine levers 14 according to the present invention, wherein FIG. 3 is a top view of the work machine levers 14 mounted to the steering post 12 disposed in the operation room 11 and FIG. 4 is a side view of such levers 14.

As described above, the steering post 12 stands on the floor face of the front end portion of the operation room 11. The steering post 12 has a hollow box body in which a large number of lead wires connected to a controller or various meters (not shown) are accommodated. A top portion of the steering post 12 is oriented to face the driver's seat 11b. Various meters and displays are disposed on an upper half portion of the top portion to form the display panel portion 12'. At a lower half portion of the top portion, the steering wheel 13 for traveling is mounted to an end of the steering shaft 13a extending toward the driver's seat 11b. Various switches are mounted to the periphery of the steering shaft 13a. Further, the steering post 12 can swing back and forth with respect to its standing base end portion as a pivot to be fixed at a seated operating position A and a standing operating position B, as described above.

The work machine levers 14 are pivotally mounted at their base end portions to portions below the portion at which the steering shaft 13a is mounted to the steering post 12. According to the embodiment shown in FIGS. 3 and 4, left and right work machine levers 14 are integral with each other and extend obliquely rearward from left and right side walls of the steering post 12 penetrating the steering post 12. Alternatively, the left and right work machine levers 14 may be individually mounted to the steering post 12 so as to be pivotally rotatable. An operating lever 16a for a specific work machine is mounted to each of the left and right work machine levers 14.

The left and right work machine levers 14 comprise arms 15 extending respectively from the left and right side walls of the steering post 12 toward left and right side portions of the steering wheel 13 so as to be V-shaped, and lever-support-box bodies 16 which constitute lever-operating portions mounted to respective end portions of the arms 15, as shown by a solid line in FIG. 3. According to this embodiment, the end portions of the arms 15 are bent toward the left and right to form support shaft portions 15a for the lever-support-box bodies 16. The lever-support-box bodies 16 are mounted to be pivotally rotated about the support shaft portions 15a so as to be fixed at a number of positions.

Figure 5:
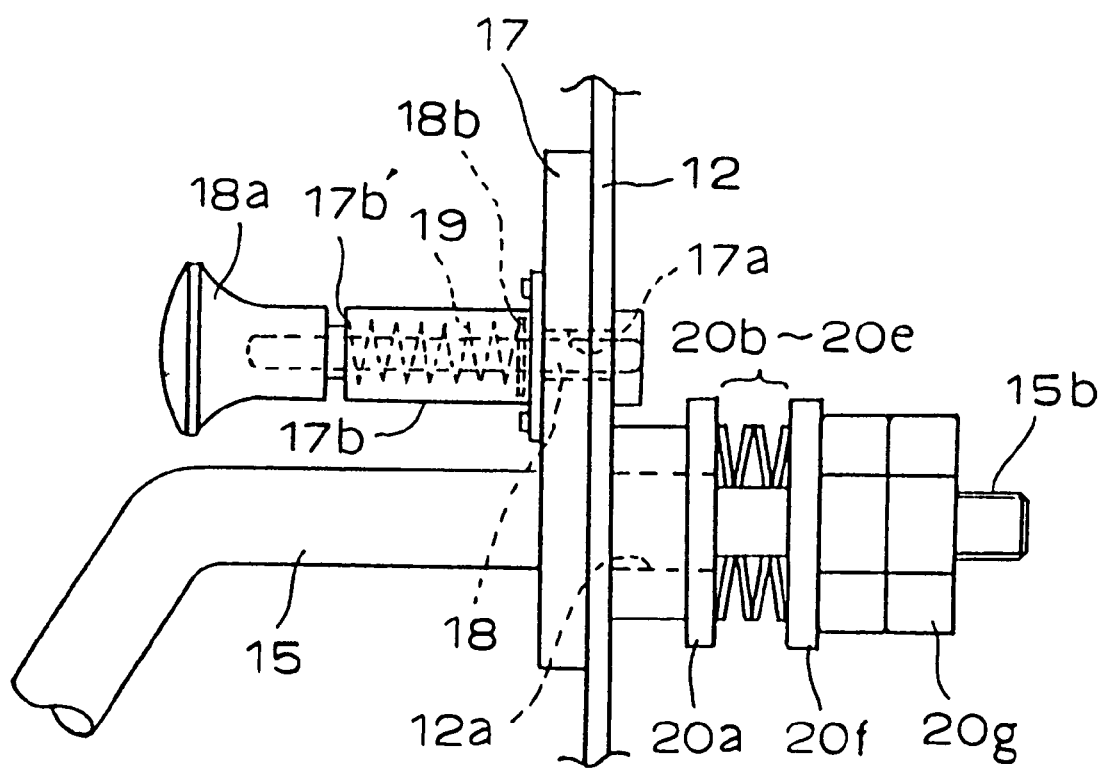
FIG. 5 is a fragmentary side view showing a typical support structure of the work machine lever on a steering post.
Figure 6:
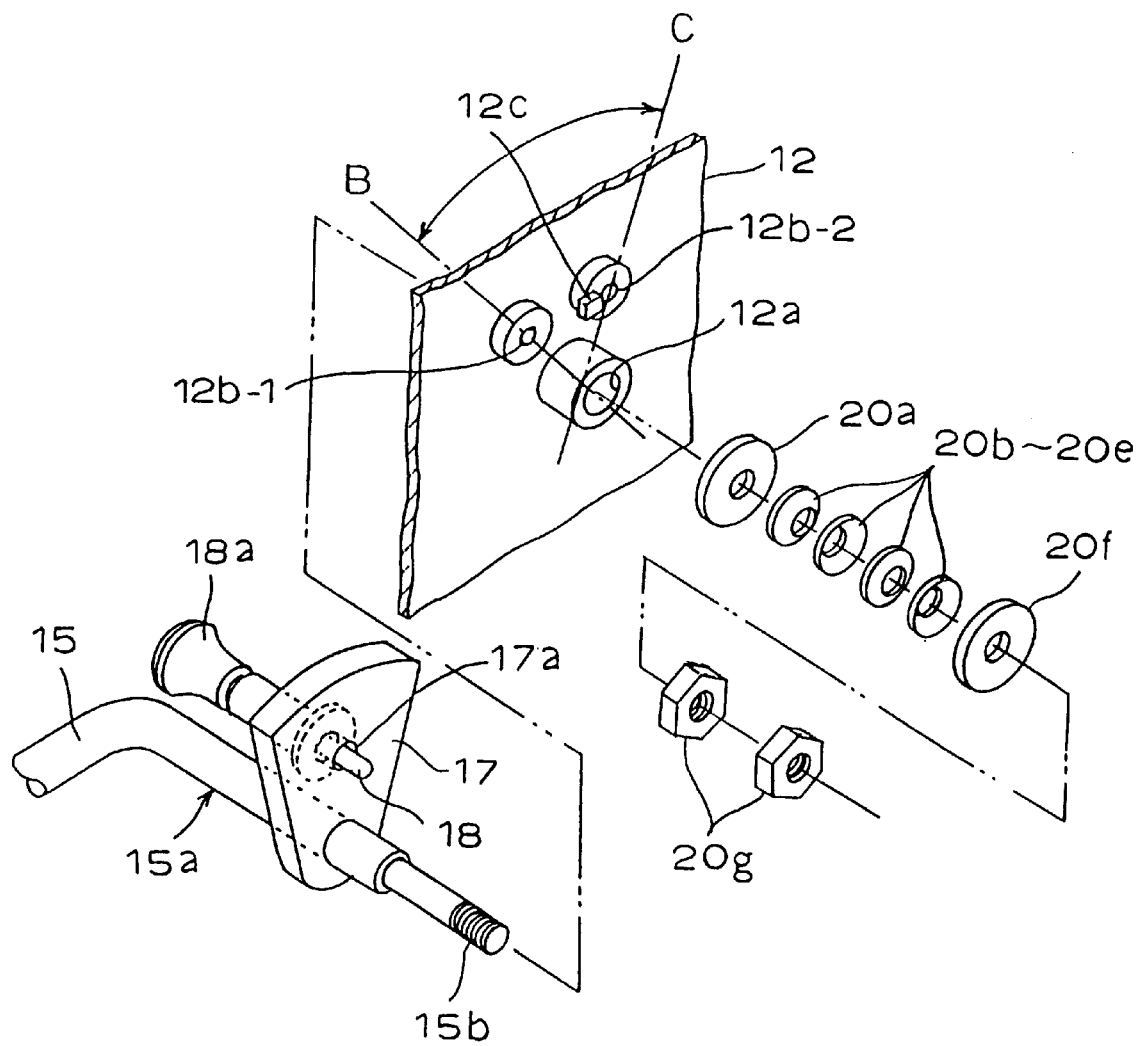
FIG. 6 is an exploded perspective view showing a mounting structure of FIG. 5.

FIGS. 5 and 6 show an example of a mounting structure of the arms 15 to the steering post 12. In FIGS. 5 and 6, left and right two work machine levers 14 are individually mounted to the left and right side walls of the steering post 12. In these Figures, the steering post 12 is shown as a simple plank for better understanding. The mounting structure of the arm 15 at a front left side seen from the operating seat will be described below. Because the mounting structures of the left and right arms are symmetric with each other in this illustrated embodiment, and the left and right arms 15 are integral with each other as shown in FIG. 3, it is sufficient that the right arm 15 simply penetrates through the right side wall of the steering post 12 to be pivotally supported.

In the mounting structure of the arms 15 shown in FIGS. 5 and 6, a work-machine-lever-mounting portion of the left side wall portion of the steering post 12 is defined with a support hole 12a having a boss, and a base end portion of the arm 15 is inserted from outside of the steering post 12 through the support hole 12a having the boss. First and second pin-fitting holes 12b-1 and 12b-2 are formed above the support hole 12a having the boss on the same circumference with a predetermined phase difference.

In the present embodiment, a safety switch 12c is mounted in the vicinity of the second pin-fitting hole 12b-2. When the microswitch 12c is turned on, an output signal from the switch is input into a controller (not shown). The controller includes a interrupting circuit for interrupting every input signal from the work machine levers 14 and other various activating switches based on the input signal so as to bring every work machine into a non-operating state.

On the other hand, the arms 15 are made of metal pipe material. Through inside spaces of the arms 15, lead wires connected to electric equipment built-in the lever-support-box bodies 16 are inserted. The base end portion of the arm 15 defines a smaller diameter portion extending from a diameter portion connected to a lever operating end via a step portion. The smaller diameter portion defines at its end a first outer thread 15b. On other hand, a friction plate 17 is secured to a vicinity of an end portion of the larger diameter portion. A pin hole 17a for insertion of a fixing pin 18 is defined at a position of the friction plate 17 with a predetermined distance away from an axial center of the arm 15. The distance between the pin hole 17a and the axial center of the arm 15 is equal to a distance between the bossed support hole 12a and each of the pin-fitting holes 12b-1 and 12b-2 which are formed on the steering post 12. A compression-spring-accommodating box 17b is secured to a surface of the friction plate 17 around the pin hole 17a on a side of the extending arm 15. The fixing pin 18 is inserted through and supported in the compression-spring-accommodating box 17b to be supported in the compression-spring-accommodating box 17b. A knob 18a is mounted to an outer end portion of the fixing pin 18 and a retainer 18b is secured to a middle portion of the pin 18. A compression spring 19 is interposed between an outer bottom portion 17b' of the compression-spring-accommodating box 17b and the retainer 18b.

The arm 15 having a structure as described above is inserted into the bossed support hole 12a of the steering post 12 from outside. As shown in FIGS. 5 and 6, a first washer 20a, four disc springs 20b to 20e, and a second washer 20f are successively fitted to the inserted end portion of the arm 15. Finally a double nut 20g is fastened to the end portion of the inserted arm 15. At this time, by adjusting a degree of fastening of the double nut 20g, resilience of the disc springs 20b to 20e is adjusted to determine a friction force generated between the friction plate 17 and the steering post 12.

Figure 7:
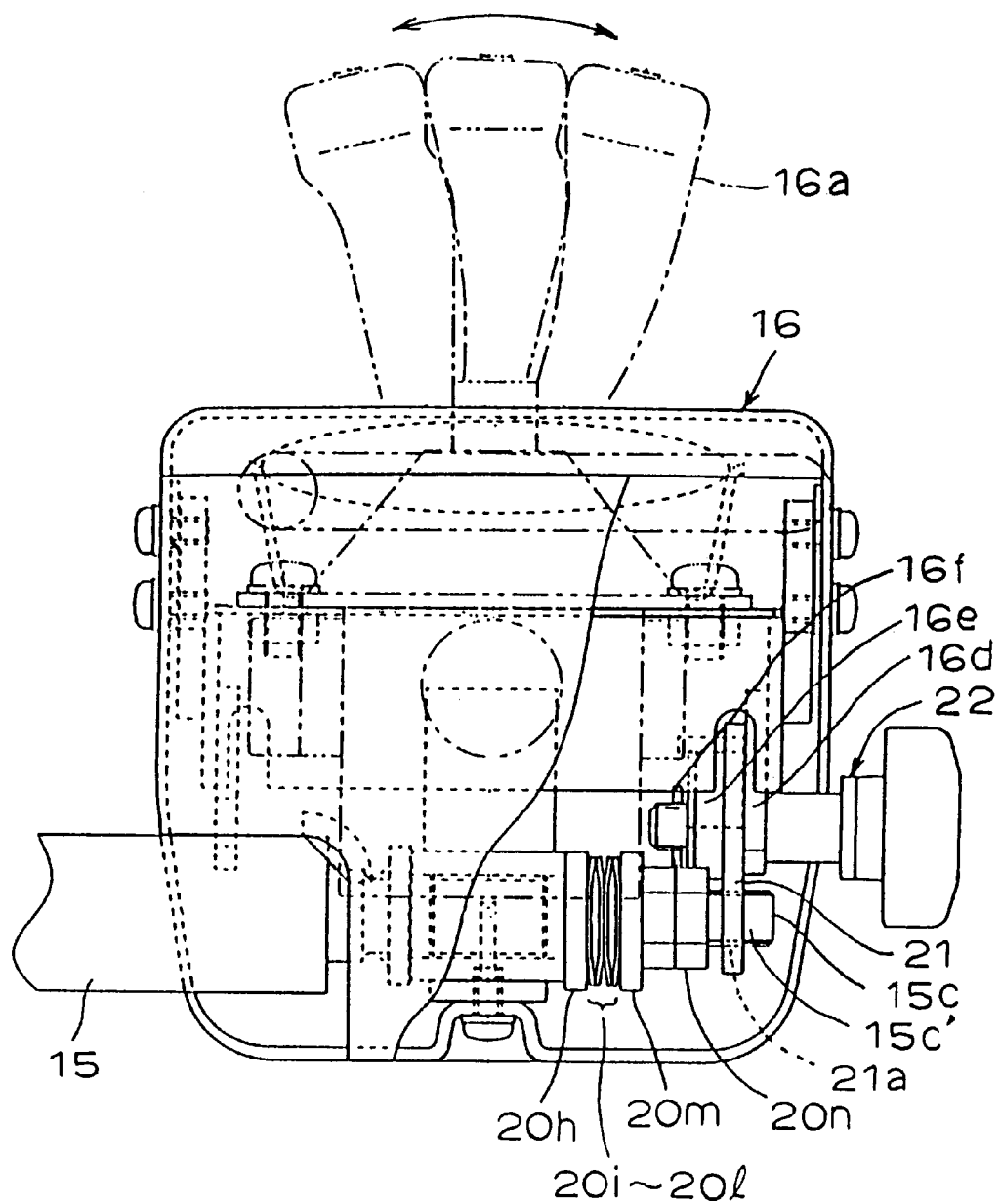
FIG. 7 is a front view, partly broken, of a support structure of a lever-support-box body pivotally supported by a support shaft portion of the work machine lever.
Figure 8:
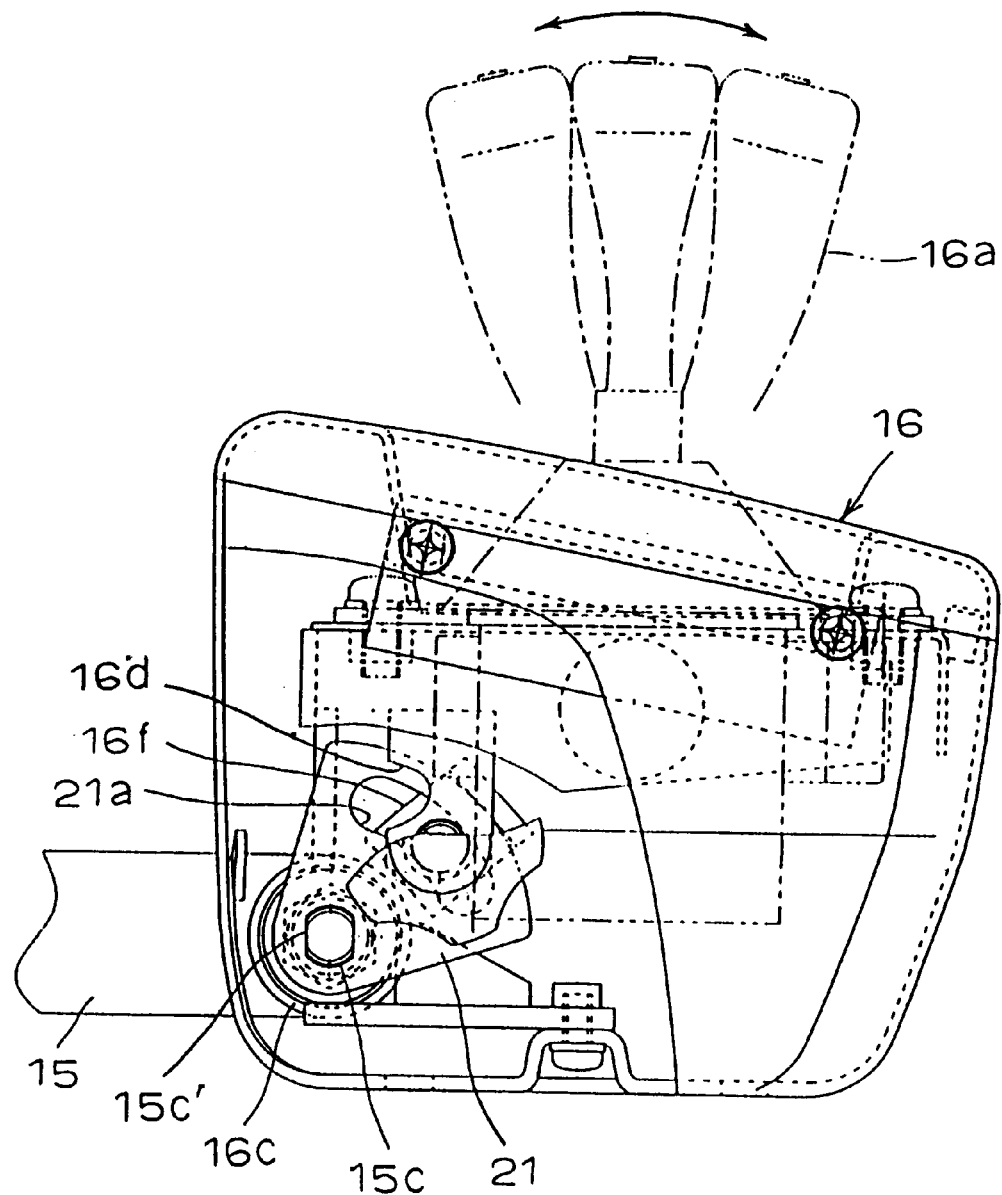
FIG. 8 is a side view of the structure shown in FIG. 7.

FIGS. 7 and 8 show an embodiment of a mounting structure of the lever-support-box bodies 16 as the lever-operating portions of the present invention with respect to the arms 15. As described above, the lever-support-box bodies 16 are respectively mounted to the shaft portions 15a of the end portions of the arms 15 so as to be pivotally movable, the arms 15 respectively extending toward left and right side portions of the steering wheel 13 to be V-shaped. An operating lever 16a is mounted to project from the lever-support-box body 16 so as to be operatively movable in vertical and lateral all directions with its base end portion as a pivot. Two pairs of potentiometers (not shown) are accommodated in the lever-support-box bodies 16, for detecting an operation stroke amount and an operating direction of the operating lever 16a and outputting a detection signal to a controller (not shown). Based on a command signal from the controller, each of or a combination of a plurality of extension/contraction amounts of the respective cylinders is controlled through a proportional electromagnetic valve, for example, to allow the respective work machines to be operated under control. For this purpose, respective lead wires connected to electric terminals accommodated in the lever-support-box body 16 are connected to a controller and the respective hydraulic valves disposed under the floor face of the operation room 11 and the driver's seat from the lever-support-box body 16 through the arm 15 and the steering post 12.

According to the illustrated embodiment shown in FIGS. 7 and 8, the lever-support-box body 16 is in a shape of a rectangular box. The shaft portion 15a of the arm 15 is horizontally inserted through an arm-inserting hole 16b defined on a left or right side wall of a front lower corner portion of the lever-support-box body 16, and is inserted through and supported by a bearing portion 16c formed at a center of a bottom portion of the lever-support-box body 16. An inserting end portion of the arm 15 is formed to have a smaller diameter with its tip end having a second outer thread 15c. A third washer 20h, four disc springs 20i to 20l, and a fourth washer 20m are successively fitted to the smaller diameter portion and are fastened by a double nut 20n. By pushing the third washer 20h against the bearing portion 16c, the lever-support-box body 16 is prevented from easily rotating due to its weight.

A portion of a peripheral face of the second outer thread 15c of the arm 15 is cut out and a base portion of a sectoral plank 21 is fitted and fixed in the cutout portion 15c'. The sectoral plank 21 has an arc hole 21a, and a fastening bolt 22 having a knob is inserted into the arc hole 21a through a bolt inserting hole formed in the lever-support-box body 16 from outside. On the other hand, two brackets 16d and 16e are vertically disposed inside the lever-support-box body 16 to sandwich the sectoral plank 21. A third bracket 16f is fixed to the lever-support-box body 16 at a position adjacent to the inner bracket 16d. Bolt inserting holes are respectively formed in the first and second brackets 16d and 16e at respective portions corresponding to the arc hole 21a defined in the sectoral plank 21. Likewise, a thread hole into which an end portion of the knobbed fastening bolt 22 is threaded is formed at a corresponding position of the third bracket 16f.

According to the mounting structure of the work machine levers according to the present embodiment having the above structure, the steering post 12 is leant toward the driver's seat 11a with its standing base end portion as a pivot, when the operator handles the lever in his/her seated position. At this time, because the lever-support-box bodies 16 which constitute the lever-operating portions of the work machine levers 14 are positioned on opposite sides of the steering wheel 13 and in obliquely upper directions from the driver's seat 11a as shown by a solid line in FIG. 1, the operator can handle the steering wheel and the work machine levers together extremely easily. When the operator handles the work machine levers in his/her standing position, the steering post 12 is pivotally rotated forward away from the driver's seat 11a with its standing base end portion as a pivot. At this time, because the lever-support-box bodies 16 are still positioned on the sides of the steering wheel 13 as shown by an arrow B in FIG. 4, the operator can handle both the steering wheel and the work machine levers extremely easily likewise the case when the operator is seated.

In this operation of the work machine levers, in order to pivotally rotate the lever-support-box body 16 with the support shaft portion 15a of the arm 15 as a pivot and then fix it at arbitrary positions, firstly the bossed fastening bolt 22 is loosened to be detached from the thread hole of the third bracket 16f. Then the operator holds the knob to move the fastening bolt 22 along the arc hole 21a formed in the sectoral plank 21 to pivotally rotate the lever-support-box body 16 at a required angle. The lever-support-box body 16 pivotally rotates while receiving a necessary resistance due to a friction force generated between the third washer 20h and the bearing portion 16c. When the necessary pivotal movement is completed, the knobbed fastening bolt 22 is inserted into the thread hole defined in the third bracket 16f. The first and second brackets 16d and 16e are resiliently deformed by the threading force to sandwich, press, and support the sectoral plank 21 to fix the position of the lever-support-box body 16. According to the present embodiment, the operator can adjust the lever-support-box body 16 on the arm 15 to an desired angle at which the operator can easily handle the lever.

When the operator leaves the operation room 11 after finishing the work, as in FIGS. 5 and 6, the operator holds the knob 18a of the fixing pin 18 mounted to the friction plate 17 and pulls the fixing pin 18 outward against a resilient force of the compression spring 19 to pull the fixing pin 18 out of the first pin-fitting hole 12b-1 formed at a position B (FIG. 6) of the steering post 12. In this state, the entire arm 15 is pivotally rotated upward with the bossed support hole 12a formed in the steering post 12 as a pivot against the friction force generated between the friction plate 17 and the steering post 12. When the fixing pin 18 reaches the second pin-fitting hole 12b-2 formed at a position C (FIG. 6) of the steering post 12, the fixing pin 18 is automatically fitted into the second pin-fitting hole 12b by a resilient force of the compression spring 19. Thus, the work machine lever 14 is pivotally rotated to a position C shown by a virtual line in FIGS. 3 and 4, i.e., the sides of the steering wheel 13 at a front position of the operation room 11 and then fixed. Therefore, spaces which are sufficient to allow the operator to pass through for getting on and off are obtained on the sides of steering wheel 13 such that the operator can easily get off the vehicle without interfering with the operating lever 16a of the lever-support-box body 16. Similarly, the operator can get on the vehicle without such interference when starting to work.

In the present embodiment, when the work machine lever 14 is rotated and fixed to a front position, the fixing pin 18 is necessarily fitted into the second pin-fitting hole 12b-2. At this time, an end portion of the fixing pin 18 is brought into contact with a microswitch 12c to automatically turn on a safety switch to bring all the work machines into non-operating states through the controller. Therefore, if the operator interferes with the operating lever 16a, the work machines are not activated so that safety can be secured.

Figure 9:
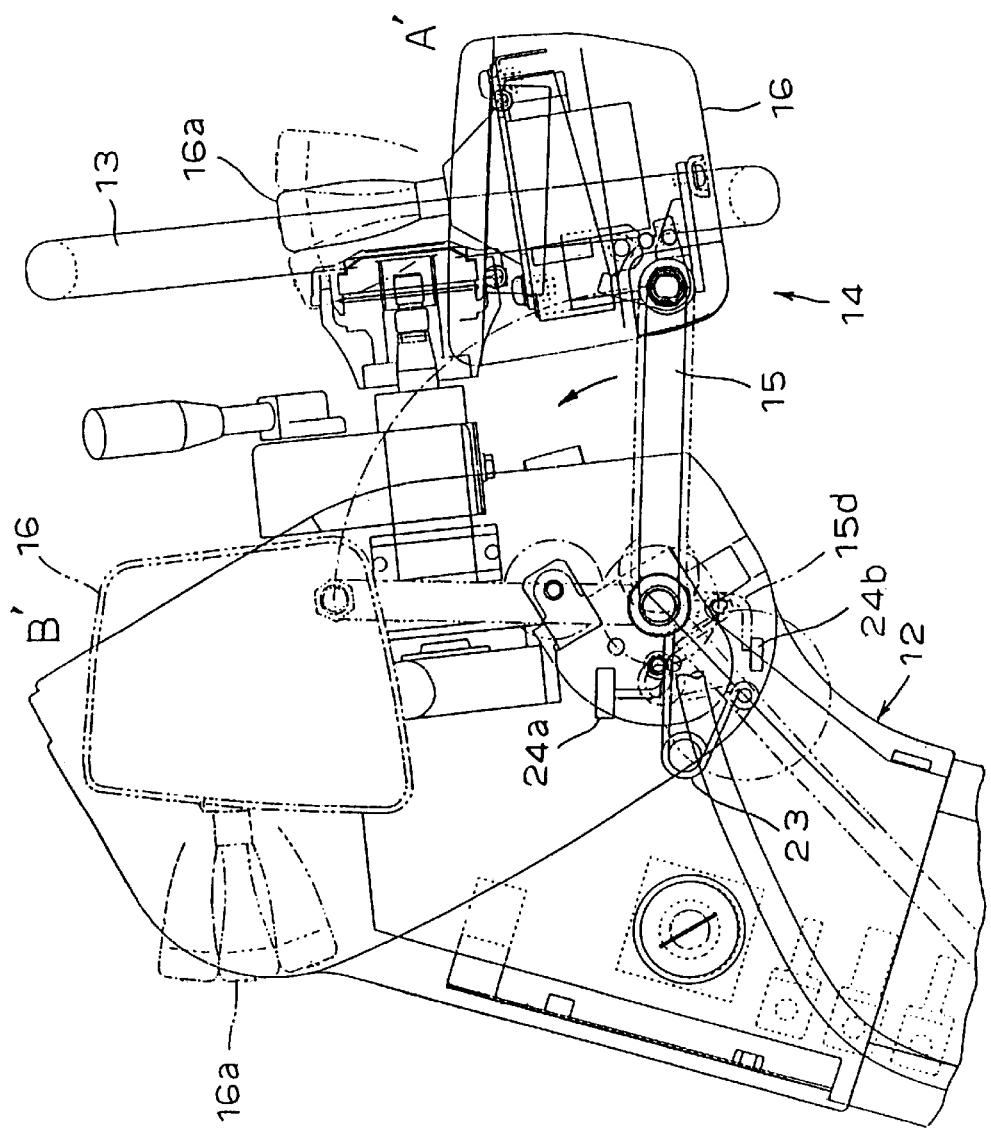
FIG. 9 is a fragmentary side view of another embodiment of a support structure of the work machine lever on a steering post.

FIG. 9 shows another embodiment of the pivotal-rotation-fixing mechanism of the work machine lever 14. According to this example, as a pivotal-rotating-fixing mechanism for rotating the work machine lever 14 between a normal lever-operating position A' on a side of the steering wheel and a lever non-operating position B' in front of the steering wheel and fixing the work machine lever 14 at respective positions A' and B', a torsional coil spring 23 is used instead of fitting and fixing of the fixing pin 18 in the above embodiment shown in FIGS. 5 and 6. As a rotation-suppressing means of the work machine lever 14 though it is omitted in FIG. 9, the friction plate 17 is pushed against the steering post 12 by utilizing resilience of the disc springs 20b to 20e, the friction plate 17 is pressed against the steering post 12, so that rotation of the work machine lever 14 is suppressed by the friction force generated between the friction plate 17 and the steering post 12, similarly to the above embodiment.

An L-shaped piece 15d is mounted to project from the shaft portion 15a of the arm 15 of the work machine lever 14 inserted into the steering post 12. The torsional coil spring 23 is secured at its one end to the L-shaped piece 15d. The other end of the torsional coil spring 23 is secured to the side wall of the steering post 12. The side wall of the steering post 12 has contact pieces 24a and 24b with which an end portion of the L-shaped piece 15d is brought into contact at positions corresponding to pivotal-rotation-limit positions of the work machine lever 14. With such a structure, when the work machine lever 14 is rotated, the torsional coil spring 23 is brought into a compressed state before the work machine lever 14 reaches its rotation limit position. When the work machine lever 14 reaches the rotation limit position, and the L-shaped piece 15d is brought into contact with one of the collision contact pieces 24a and 24b so as to prevent further pivotal rotation of the work machine lever 14, the torsional coil spring 23 simultaneously recovers its original posture so as to firmly fix the work machine lever 14 at respective pivotal-rotation positions A' and B'.

What is claimed is:

1. A work-machine-lever-support structure for a work vehicle, wherein a work machine lever comprises a base end portion supported in a steering-wheel-support box and a free end portion disposed on a side of a steering wheel, said work machine lever having an arm and a lever-operating portion at a free end portion of said arm, and a base end portion of said arm being positioned at a side portion of an upper end portion of said steering-wheel-support box and being supported and fixed so as to be pivotally rotatable between at least two positions including an operating position on a side of said steering wheel and a non-operating position in front of said steering wheel, about said base end portion.

2. A work-machine-lever-support structure according to claim 1, wherein said base end portion includes a means for suppressing a pivotal rotation of said work machine lever.

3. A work-machine-lever-support structure according to claim 1, wherein said work machine lever includes an arm and said lever-operating portion mounted to a free end portion of said arm, said lever-operating portion is supported and fixed at the free end portion of said arm as a pivot so as to pivotally rotatable in back and forth directions, and said steering-wheel-support box is supported at a standing base end portion thereof so as to be pivotally rotatable between a standing operating position and a seated operating position.

4. A work-machine-lever-support structure according to claim 2 further comprising a safety switch for outputting a signal for prohibiting an activation of said work machine when said work machine lever pivotally rotates to said non-operating position.

5. A work-machine-lever-support structure according to claim 2, wherein said work machine lever includes an arm and said lever-operating portion mounted to a free end portion of said arm, said lever-operating portion is supported and fixed at the free end portion of said arm as a pivot so as to pivotally rotatable in back and forth directions, and said steering-wheel-support box is supported at a standing base end portion thereof so as to be pivotally rotatable between a standing operating position and a seated operating position.

6. A work-machine-lever-support structure for a work vehicle, wherein a work machine lever comprises a base end portion supported in a steering-wheel support box and a free end portion disposed on a side of a steering wheel, said free end portion of said work machine lever having a lever-operating portion, and said lever-operating portion being supported and fixed so as to be pivotally rotatable between at least two positions, including an operating position on a side of said steering wheel and a non-operating position in front of said steering wheel, about said base end portion of said steering-wheel-support box as a pivot, and said structure further including a safety switch for outputting a signal for prohibiting an activation of said work machine when said work machine lever pivotally rotates to said non-operating position.

7. A work-machine-lever-support structure according to claim 6, wherein said work machine lever includes an arm and said lever-operating portion mounted to a free end portion of said arm, said lever-operating portion is supported and fixed at the free end portion of said arm as a pivot so as to pivotally rotatable in back and forth directions, and said steering-wheel-support box is supported at a standing base end portion thereof so as to be pivotally rotatable between a standing operating position and a seated operating position.

* * * * *